United States Patent
Ishii et al.

(10) Patent No.: US 11,209,586 B2
(45) Date of Patent: Dec. 28, 2021

(54) GHOST IMAGE ELIMINATION OF DOE USING FOURIER OPTICS METHOD

(71) Applicants: Fusao Ishii, Pittsburgh, PA (US); Mikiko Nakanishi, Tokyo (JP); Kazuhiko Takahashi, Tokyo (JP); Yuji Aburakawa, Tokyo (JP); Keiichi Murakami, Tokyo (JP)

(72) Inventors: Fusao Ishii, Pittsburgh, PA (US); Mikiko Nakanishi, Tokyo (JP); Kazuhiko Takahashi, Tokyo (JP); Yuji Aburakawa, Tokyo (JP); Keiichi Murakami, Tokyo (JP)

(73) Assignees: Fusao Ishii, Pittsburgh, PA (US); NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/843,352

(22) Filed: Dec. 15, 2017

(65) Prior Publication Data
US 2018/0275333 A1    Sep. 27, 2018

Related U.S. Application Data

(60) Provisional application No. 62/498,144, filed on Dec. 15, 2016.

(51) Int. Cl.
| | | |
|---|---|---|
| *F21V 8/00* | (2006.01) | |
| *G02B 27/01* | (2006.01) | |
| *G02B 27/18* | (2006.01) | |
| *G02B 27/48* | (2006.01) | |

(52) U.S. Cl.
CPC ....... *G02B 6/0031* (2013.01); *G02B 27/0172* (2013.01); *G02B 27/18* (2013.01); *G02B 27/48* (2013.01); *G02B 2027/011* (2013.01); *G02B 2027/0118* (2013.01); *G02B 2027/0123* (2013.01); *G02B 2027/0174* (2013.01); *G02B 2027/0178* (2013.01)

(58) Field of Classification Search
CPC ... G02B 27/01–0198; G02B 2027/0105–0198; G02B 5/18–1895; G02B 2027/01–0198; G03B 21/00–64; H04N 9/31–3197
See application file for complete search history.

(56) References Cited

U.S. PATENT DOCUMENTS

| | | | | |
|---|---|---|---|---|
| 5,161,027 A * | 11/1992 | Liu | ............... | G02F 1/133504 348/766 |
| 5,742,262 A * | 4/1998 | Tabata | ............... | G02B 27/0081 345/8 |
| 5,847,877 A * | 12/1998 | Imamura | ............... | G02B 5/1876 359/566 |
| 5,872,658 A * | 2/1999 | Ori | ............... | G02B 5/1814 359/565 |
| 7,418,202 B2 * | 8/2008 | Biernath | ............... | G02B 5/1833 348/290 |
| 2011/0164294 A1 * | 7/2011 | Shimizu | ............... | G02B 27/0172 359/13 |

(Continued)

*Primary Examiner* — Michelle M Iacoletti
*Assistant Examiner* — Christopher A Lamb, II
(74) *Attorney, Agent, or Firm* — Bo-In Lin

(57) ABSTRACT

A see-through image display system having a DOE often has undesirable light or so called ghost images due to the quantization of saw tooth shape of DOE surface. This invention provides ways to eliminate ghost images.

8 Claims, 16 Drawing Sheets

(56) References Cited

U.S. PATENT DOCUMENTS

| | | | |
|---|---|---|---|
| 2011/0194163 A1* | 8/2011 | Shimizu | G02B 27/0172 359/15 |
| 2012/0075704 A1* | 3/2012 | Ando | G02B 5/1814 359/574 |
| 2012/0218301 A1* | 8/2012 | Miller | G02B 27/017 345/633 |

* cited by examiner

GHOST IMAGE ELIMINATION OF DOE USING FOURIER OPTICS METHOD

CROSS REFERENCE TO RELATED APPLICATIONS

This application is a Non-Provisional application that claims a Priority Date of a previously filed Provisional Application 62/498,144 filed on Dec. 15, 2016. This application and Provisional Application 62/498,140 are a Continuation in Part (CIP) of Patent Application PCT/US2014/000153 filed on Jun. 27, 2014, which is a Non-Provisional filing of a Provisional Application 61/957,258 filed on Jun. 27, 2013.

TECHNICAL FIELD

This invention relates to a display system for projecting an image to a diffractive optical element enabling a see-through display with high resolution and wide field of view. More particularly, this invention relates to a display suitable for wearable displays with very small form factor.

BACKGROUND ART

Wearable displays get attention in recent years after smart phones are well accepted by the market. Wearable displays provide hands free operation as well as showing image in the distance same as regular sight. There are tremendous needs for wearable displays. However in the past, near eye displays such as Head Mount Display, Head up Display and Eye Glass Type Display not necessarily satisfied viewers, because they were often too heavy, too large, too dark, low resolution, not see through, expensive and small size of image. There are needs for light, small, bright, high resolution, see-through, stealth, inexpensive and large image. This invention provides a new display system which satisfies all of these needs.

As shown in FIG. 1 and FIG. 1A, Kasai et al. disclosed in U.S. Pat. No. 7,460,286 an eye glass type display system that implements see-through capability with a holographic optical element. This display system projects images in the normal direction from display device, more particularly perpendicular direction for a surface of LCD display, and projected light containing an image is led into optical wave guide and reflected toward the eye of viewer. Because of waveguide, the field of view and resolution are very limited.

As shown in FIG. 2 and FIG. 2A, Mukawa et al. in SID 2008 Digest, ISSN/008-0966X/08/3901-0089, "A Full Color Eyewear Display using Holographic Planar Waveguides", disclose an eye glass type display system that implements see-through capability with two plates of holographic optical elements. This system also uses a waveguide which limits resolution and field of view.

As shown in FIG. 3, Levola in SID 2006 Digest, ISSN0006-64 • SID 06 DIGEST 0966X/06/3701-0064, Novel Diffractive Optical Components for Near to Eye Displays discloses another implementation locating LCD device in the middle of two eyes, but still it requires large protruded space which enlarge the form factor. The above three types of displays are using either holographic optical element (HOE) or diffractive optical element (DOE) and all of these have some fundamental difficulties of large chroma aberration, cross talk of colors, large field curvature aberration and distortion aberration. Mukawa et al. explained how to reduce cross talk of colors using multiple wave guides, which makes the system heavier and thicker and the efficiency of utilization of light will be lower. Kasai et al. used a single HOE which helped to improve the efficiency of light utilization, although the other aberrations remained and the FOB (field of view) has to be small so that these aberrations will not be conspicuous. This invention will show how these difficulties will be removed.

As shown in FIG. 4 and FIG. 4A, Li et al. disclosed in U.S. Pat. No. 7,369,317 a compact display and camera module attachable to eye glasses. This also requires a thick PBS (polarized beam splitter) and the FOB (field of view) is rather small and this is not stealth and the presence of display is very obvious.

The examples such as FIG. 1 and FIG. 2 successfully demonstrated to public that a wearable display with see-through image is possible using holograms and wave guides. However making an accurate hologram is not an easy task which requires precise alignment of light beams and setting up of optical elements in a severe accuracy and it not easy to repeat same results consistently. On the other hand, a new method is gaining popularity utilizing a DOE (Diffractive Optical Element) which can be produced by semiconductor tools with a very repeatable way in a digital patterning technique. Digitizing the pattern of diffractive optical element often creates unnecessary ghost image because the frequency of quantization and that of DOE are not necessarily same and the difference creates a "Ghost image". This invention will show some ways to eliminate "Ghost Images" coming from DOE.

SUMMARY OF THE INVENTION

The objective of this invention is to create a see-through display using a DOE whose Fourier Transfer Function is close to zero except the intended image and other high order peaks which are out of sight.

FIG. 11 shows an example of embodiment of this invention. To create an image in good focus, a phase shift function must be designed with an optical design tool such as Code-V or Zemax, so that the reflected light focuses at a right location. Then slice the function for every 2*pi and it will generate a function as a saw tooth, a sliced phase shift function. It is possible to make the exact shape with a certain tool, but it will require a very specialized tool which is not common for a typical semiconductor fab. Then quantization method is often used so that a common semiconductor fab can handle with common tools. However this quantization will creates unnecessary Fourier peaks within the viewing angle of viewer. Then the phase shift function has to be modified by adding a negative phase in a certain manner including randomized phase addition or distorting the phase shift function so that the Fourier Transfer Function becomes almost zero.

DETAIL DESCRIPTIONS OF THE PREFERRED EMBODIMENTS

The objective of this invention is to create a see-through display using a DOE wherein the Fourier Transfer Function is close to zero except the intended image and other high order peaks which are out of the viewing sight.

Figure 1:
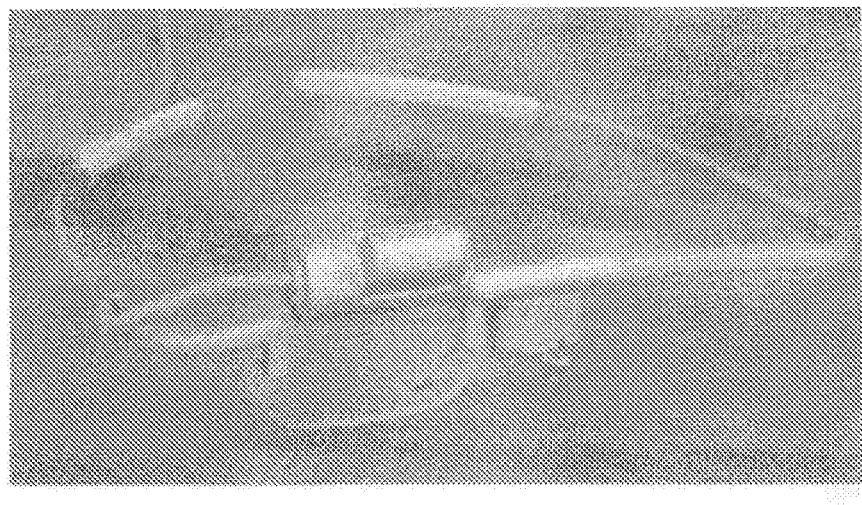
FIG. 1 is a cross sectional view of an image display system of prior art shown by Kasai in his published technical report related to U.S. Pat. No. 7,460,286.
Figure 1A:
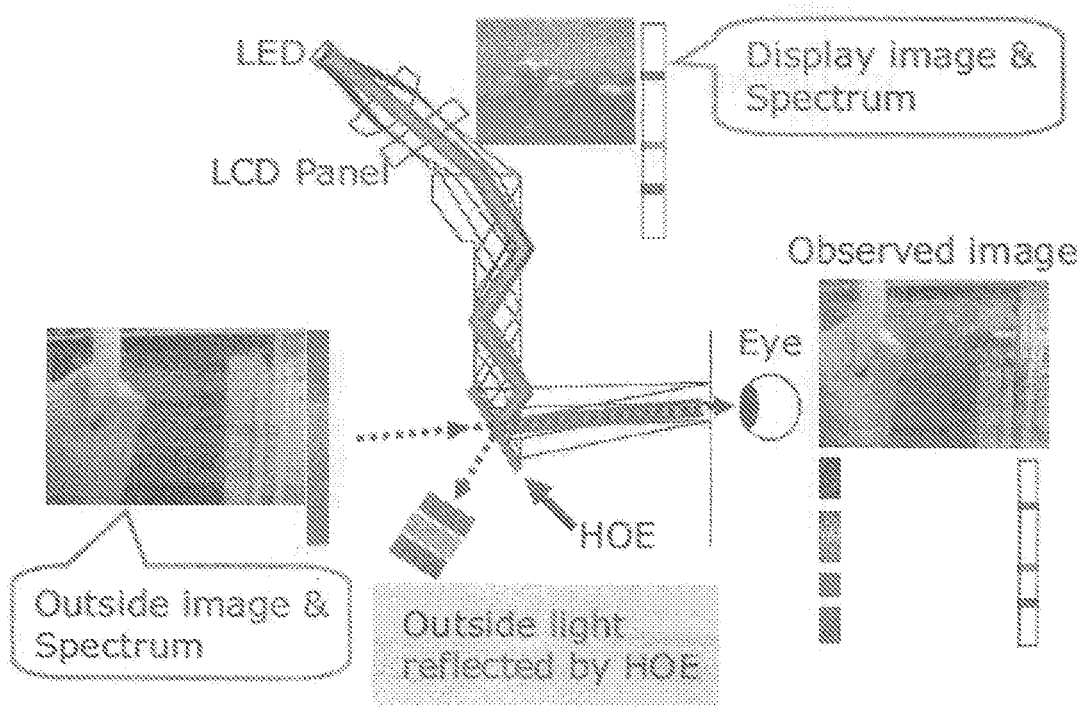
FIG. 1A is a photo of the actual sample which successfully demonstrated see-though capability. This was very successful to demonstrate the possibility of see-through-display, but it does not provide enough viewing angle or resolution.
Figure 2:
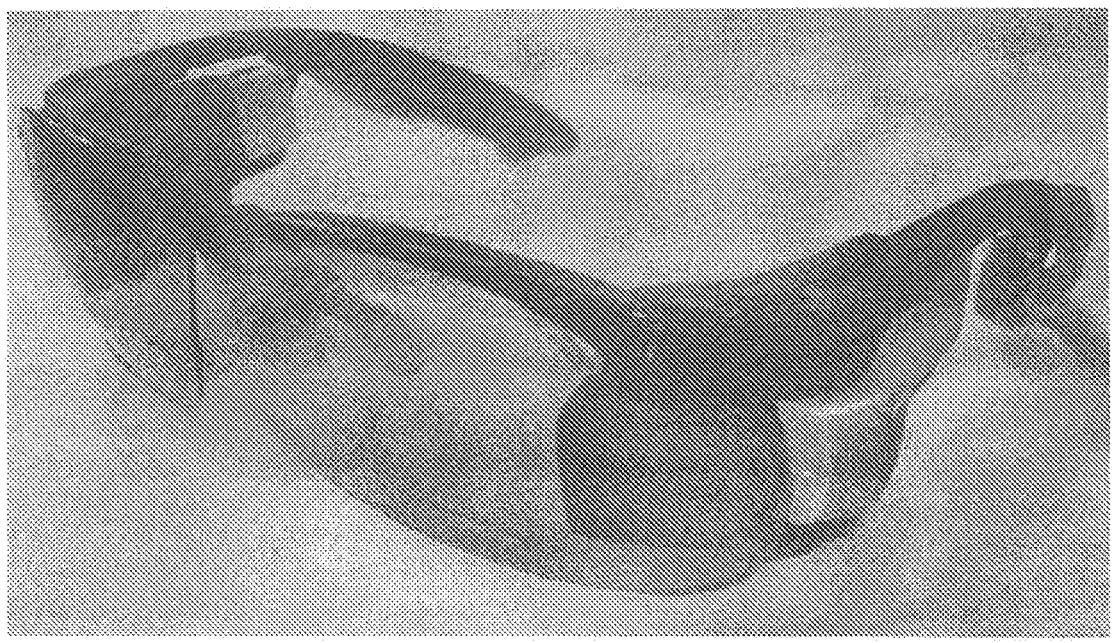
FIG. 2 and FIG. 2A are shown by Mukawa et al. in SID 2008 Digest, ISSN/008-0966X/08/3901-0089, "A Full Color Eyewear Display using Holographic Planar Waveguides". The sample of wearable display in FIG. 2A successfully demonstrated see-through capability. However, there is a need of higher resolution and wider viewing angle.
Figure 2A:
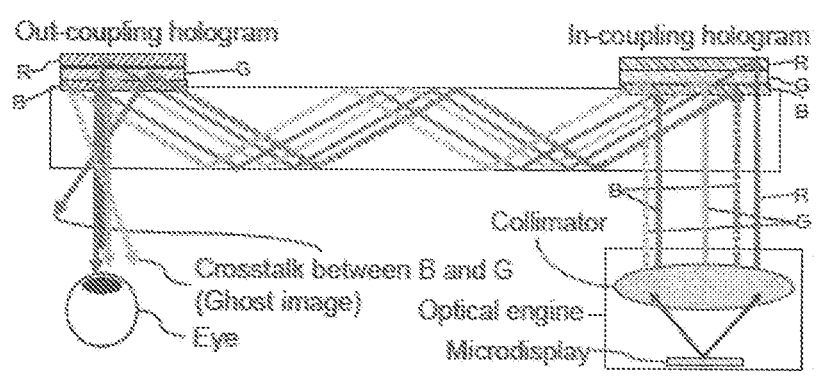
Figure 3:
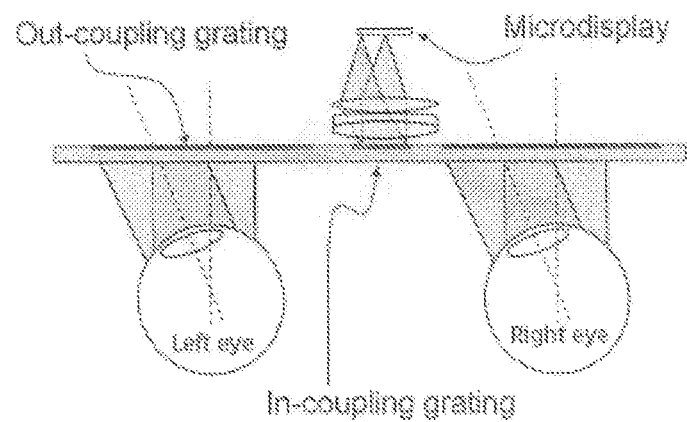
FIG. 3 is another example of prior art and reported by Levola at SID 2006 Digest, ISSN0006-64 • SID 06 DIGEST 0966X/06/3701-0064, Novel Diffractive Optical Components for Near to Eye Displays. This display has not demonstrated samples.
Figure 4:
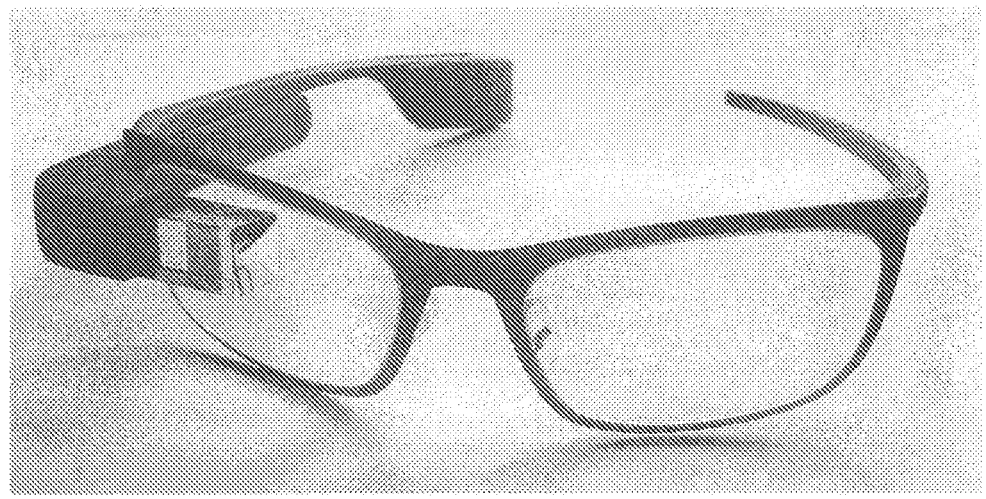
FIG. 4 shows another prior art of wearable display with see-through capability having both a display and a camera described in U.S. Pat. No. 7,369,317.
Figure 4A:
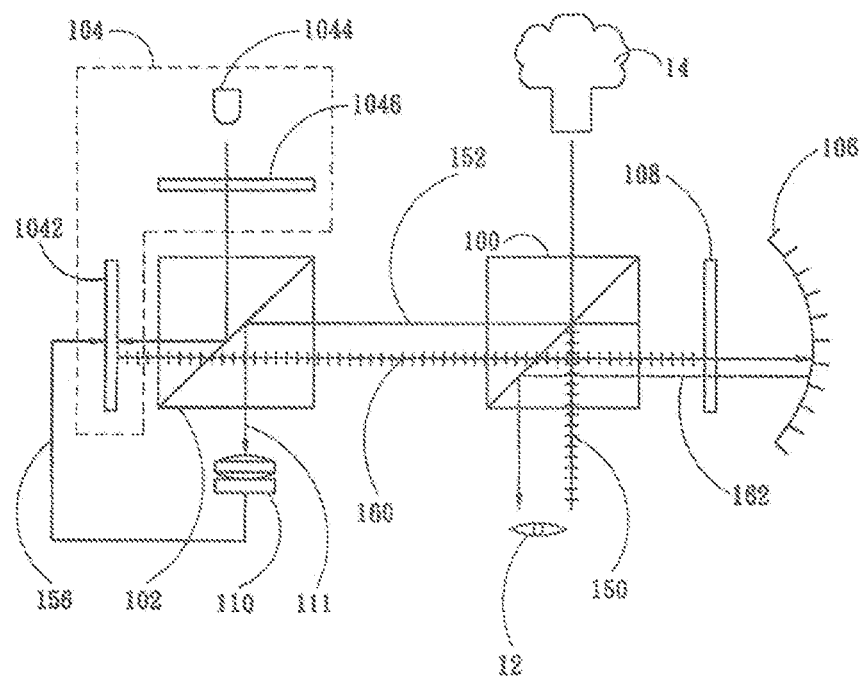
FIG. 4A is an example using a similar configuration of optics. However the size of viewing angle is not large enough.
Figure 5:
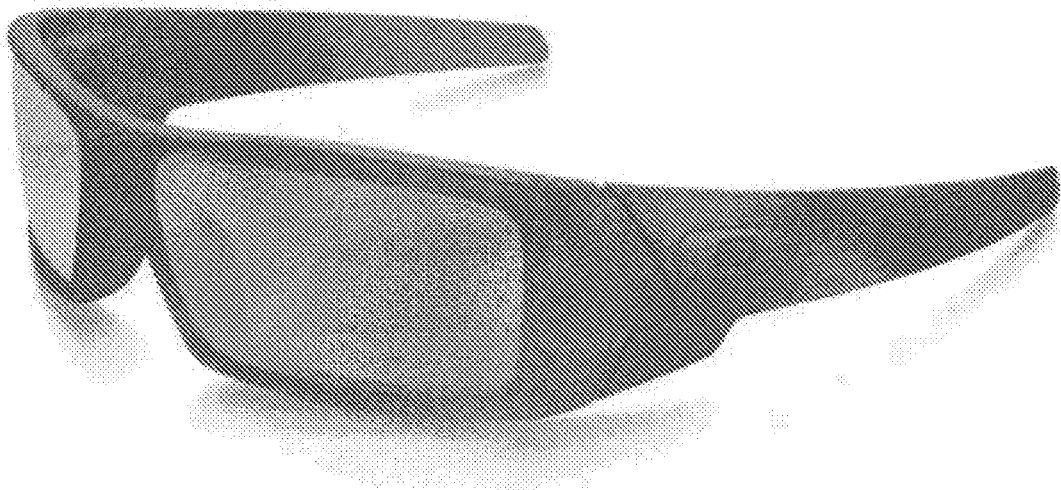
FIG. 5 and FIG. 6 are example eyeglasses having temples large enough to embed all optics and electronics of this invention, so that the existence of display is not noticeable.
Figure 6:
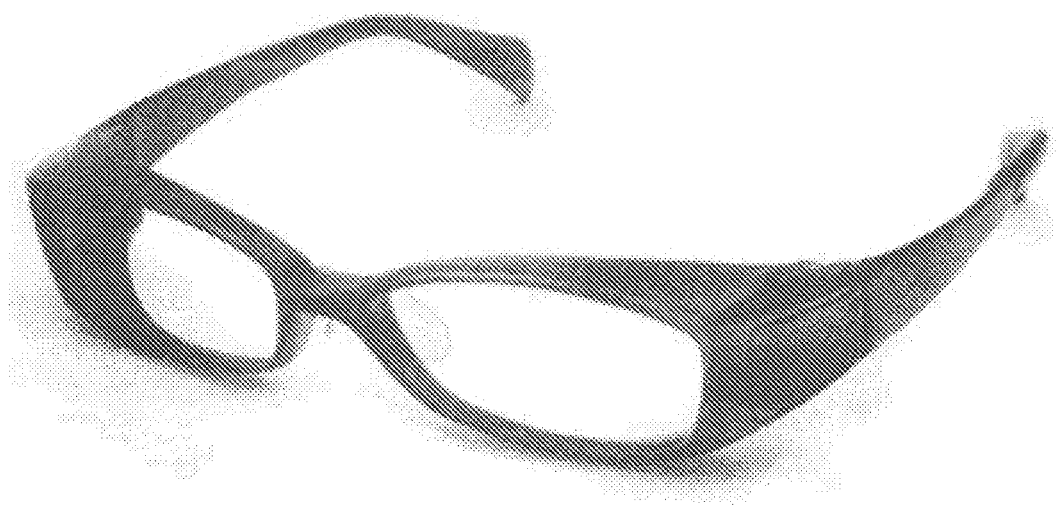
Figure 7:
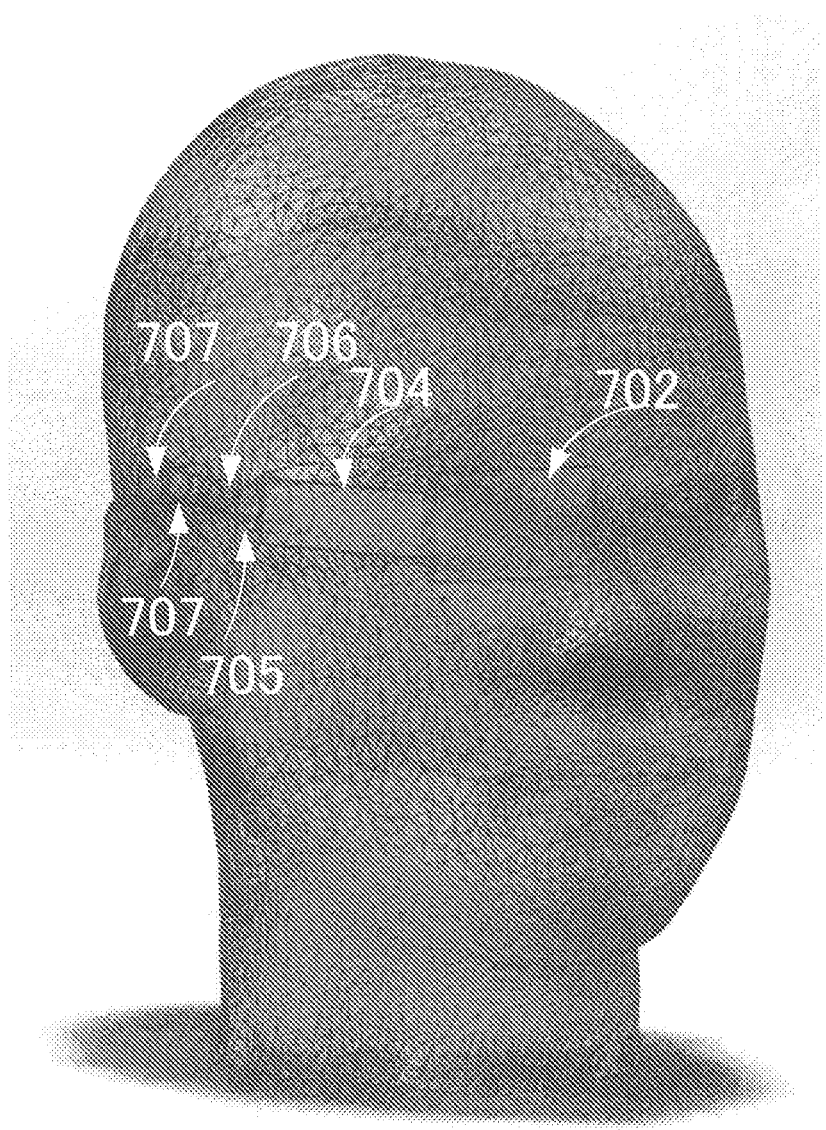
FIG. 7 is an example of this invention using a DOE as a see-through lens (702). 704 is a mirror to reflect the projected beams from a display device through the set of lenses (708, lens1), (707, lens2), (706, lens2) and (705, lens4).
Figure 8:
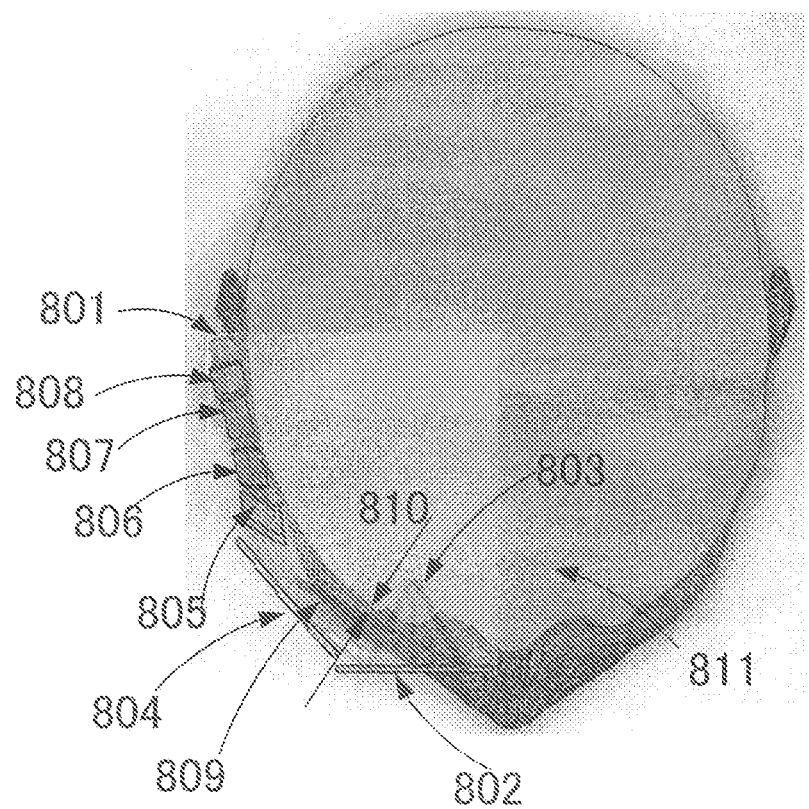
FIG. 8 shows the light paths (809 and 810) from the display (801) to the eye (803) in the head (811) after reflection by the DOE (802). The mirror (804) reflects the projected beams from the display device (801) through the set of lenses (808, lens1), (807, lens2), (806, lens2) and (805, lens4).
Figure 9:
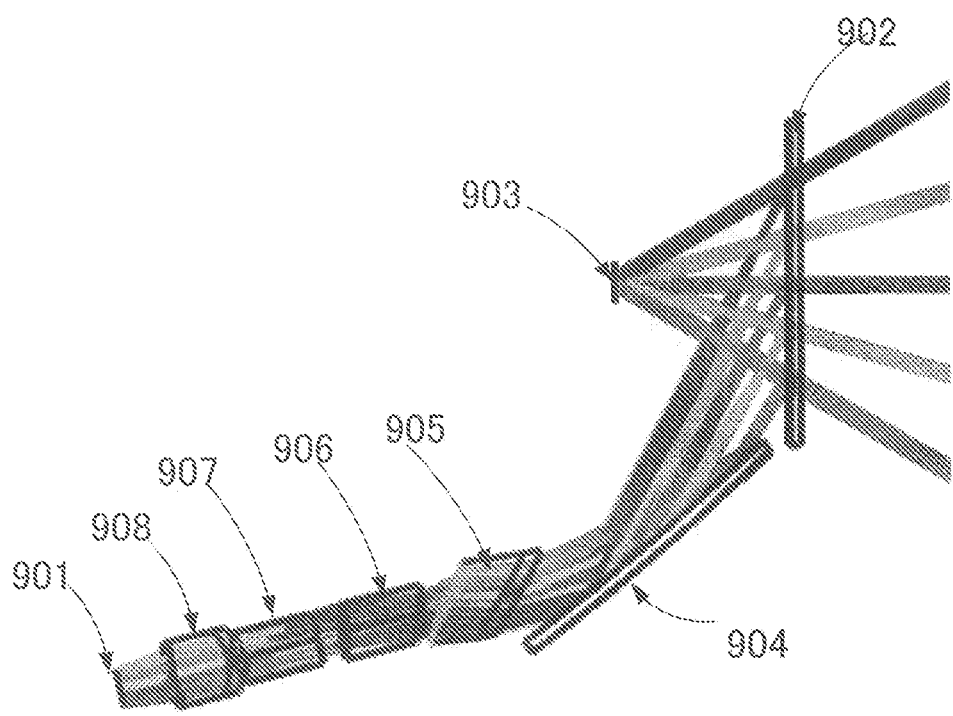
FIG. 9 shows an example of a high resolution see-through eye-glass display as an Auxiliary Reality display and its optical structure. The DOE (902) makes a see-through lens. The mirror (904) reflects the projected beams from the display device (901) through the set of lenses (908, lens1), (907, lens2), (906, lens2) and (905, lens4). The beams reflected by the mirror (904) is projected by the DOE plate (902) and focused to the retina of eye (903).
Figure 10:
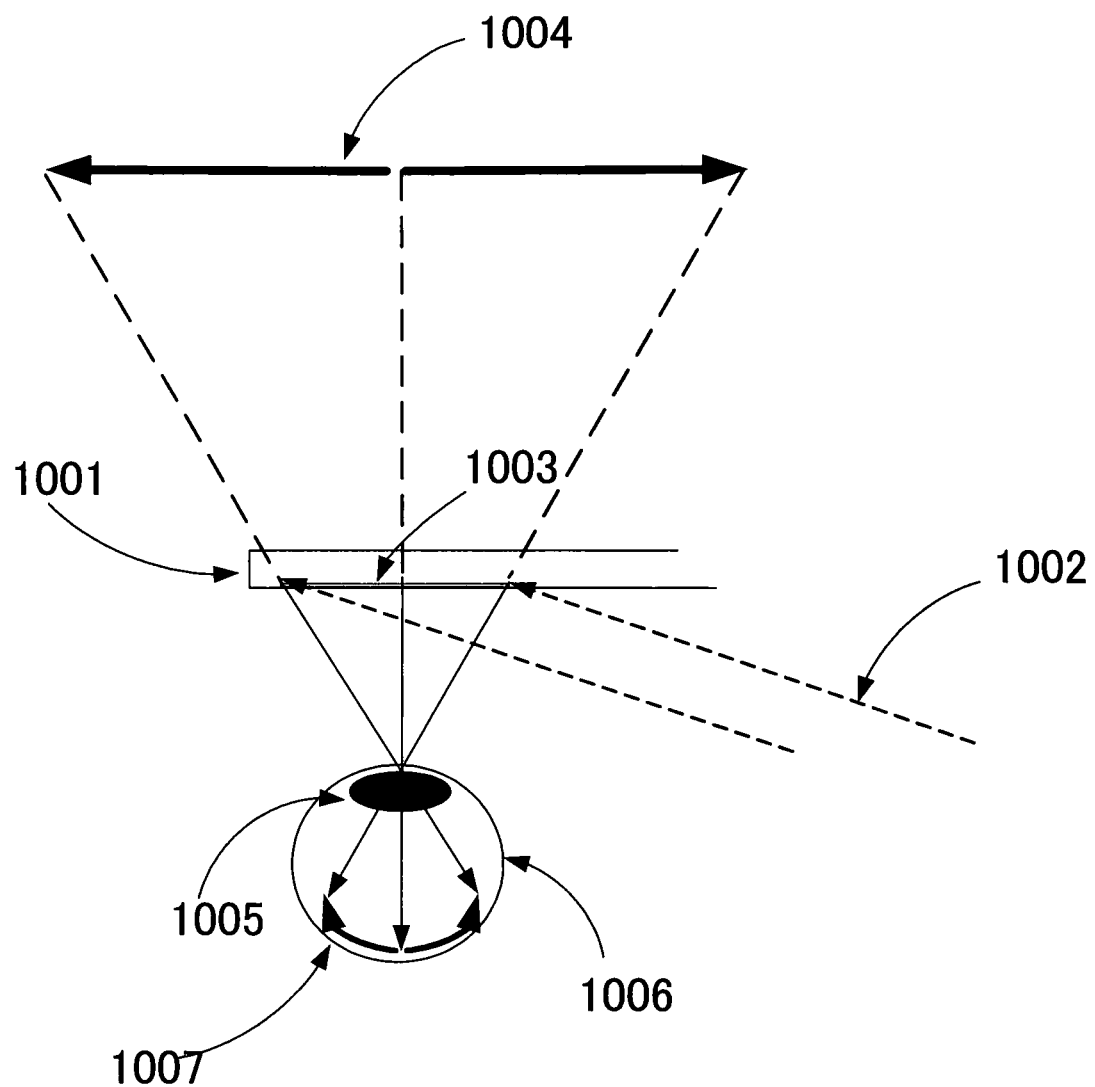
FIG. 10 shows an example of the light path. The beams from a mirror (1002) are reflected by the DOE plate (1001) at the area (1003) and focused at the retina (1007) through the pupil (1005) of the eye (1006). The image (1004) is formed at a distance.
Figure 11:
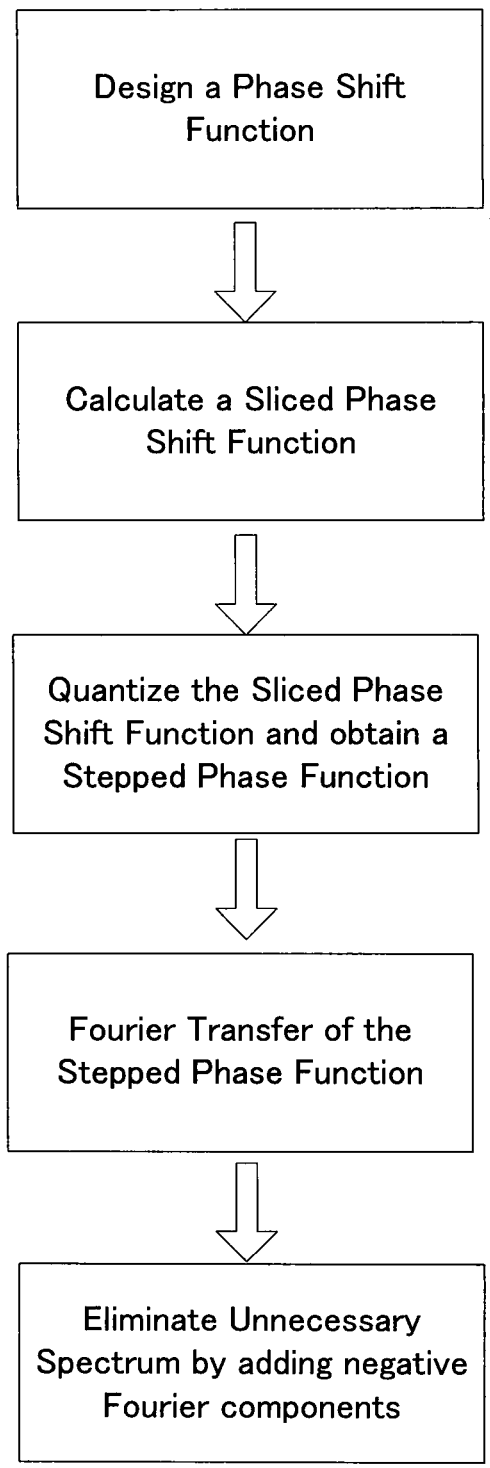
FIG. 11 illustrates a procedure to make a DOE to eliminate ghost images.
Figure 12:
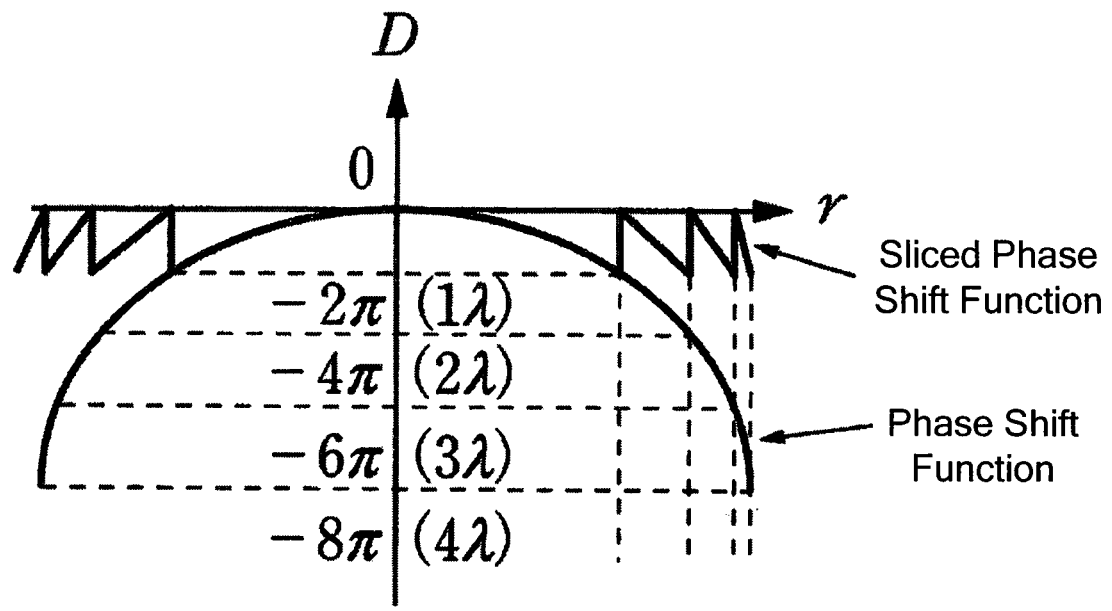
FIG. 12 illustrates a structure of a phase function which reflects projected light toward an eye.
Figure 13:
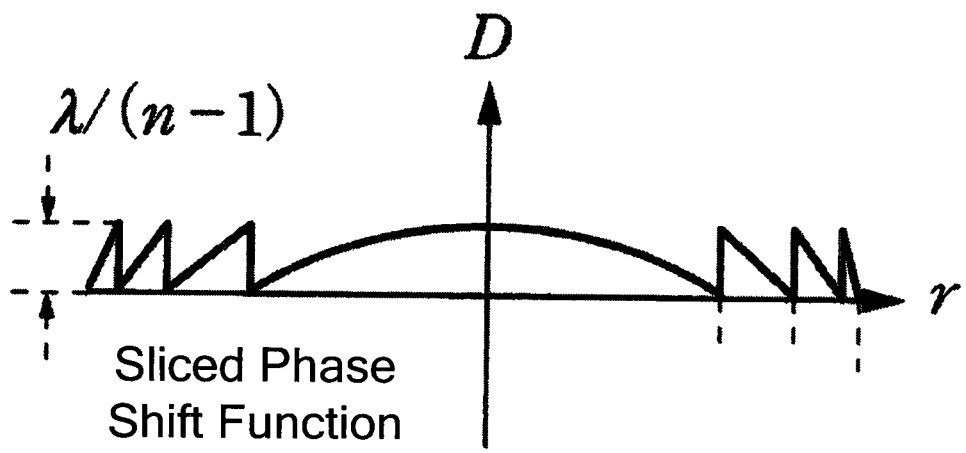
FIG. 13 shows a process to convert the phase function to a sliced phase function whose pattern will be made on a wafer by semiconductor processes.

FIG. 11 shows an example of embodiment of this invention. To create an image in good focus, a phase shift function must be designed with an optical design tool such as Code-V or Zemax, so that the reflected light focuses at a right location. Then slice the function for every 2*pi and it will generate a function as a saw tooth, a sliced phase shift function. It is possible to make the exact shape with a certain tool, but it will require a very specialized tool which is not common for a typical semiconductor fab. Then quantization method is often used so that a common semiconductor fab can handle with common tools. However this quantization will creates unnecessary Fourier peaks within the viewing angle of viewer as the example shown in FIG. 16 (calculated Fourier Transfer) and FIG. 17 (actual experimental result). Then the phase shift function has to be modified by adding a negative phase in a certain manner including randomized phase addition or modifying the phase shift function so that the Fourier Transfer Function becomes almost zero.

Figure 16:
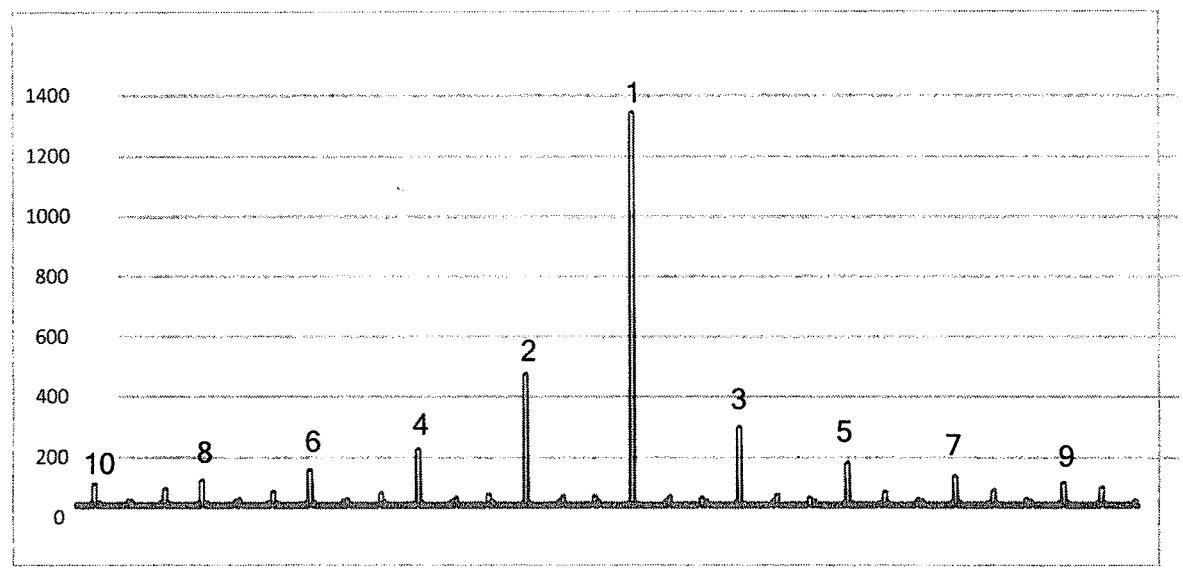
FIG. 16 shows an example of Fourier spectrum of the structure shown in FIG. 5. The first (largest) peak of the spectrum is marked as "1" and the second peak is marked "2" and continues to "3", "4", "5", "6", "7", "8", "9" and "10" in the order of the intensity of spectrum.
Figure 17:
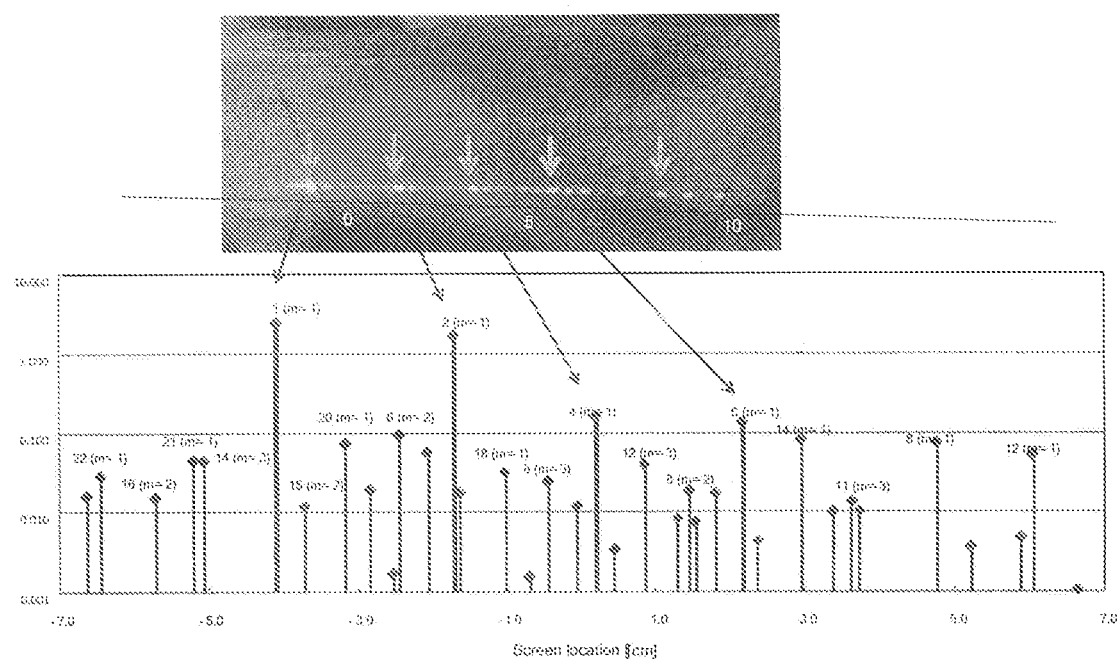
FIG. 17 shows an example of image projected to a screen and it correlates to Fourier spectrum. The horizontal axis is length in milli-meter and the vertical axis is the intensity of spectrum and the intensity of light beams. The line marked "1(m=1)" shows the highest peak of the spectrum calculated from Fourier spectrum and m=1 indicates that the diffraction order is 1. The second peak is marked as "2(m=1)" and is also from the first order of diffraction (m=1).

The addition of negative Fourier Transfer function can be done as the following steps. 1) Design an optics system including lens and mirrors to project image to a DOE. 2) Follow the steps in FIG. 11 to obtain the Fourier Transfer Function of the quantized phase shift function as FIG. 16. 2) Identify which peaks are undesirable peaks within the viewing angle. 3) Extract the undesirable peaks and apply Fourier Inverse Transfer of the extracted peaks and add this inverse transfer function to the original phase shift function and recalculate the process until the undesirable peaks disappear.

Figure 14:
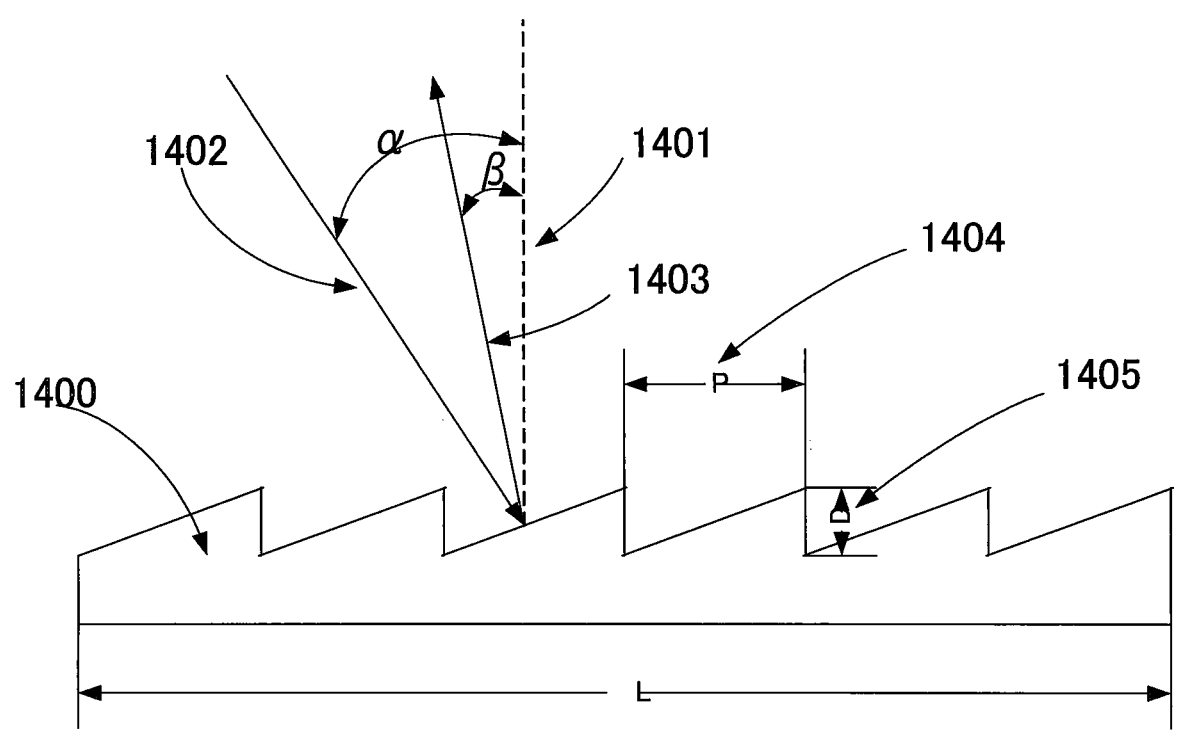
FIG. 14 illustrates the structure of DOE (1400), wherein the incident beam (1402) is reflected by the surface of DOE and the reflected beams is shown as (1403). The dotted line (1401) is the normal vector of the plate of DOE and the arrow marked as p and (1404) is the pitch of sawtooth shaped groves and 1405 is the depth of the groves.
Figure 15:
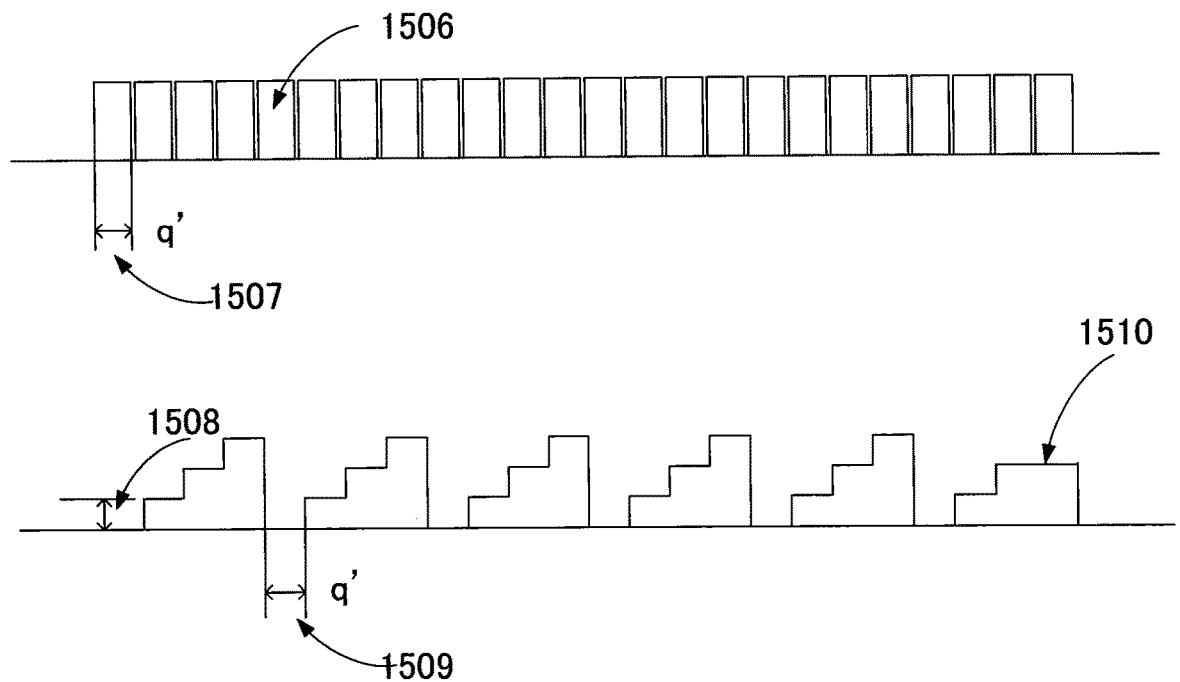
FIG. 15 shows an example of DOE made by lithography method. A reticle having the width marked q' (1507 and 1509) with the patterned area (1506) is used to expose the stepped pattern (1510). The line (1508) is the height of each step.

Another example of embodiments is to randomize the phase shift function so that the undesirable peaks will be diluted into noises. The pitch marked as "p" in FIG. 14 can be randomized to eliminate ghost peaks. Calculate P'=P+ (random number) using a normal distribution having zero average and standard variance is about 10% of P for example. This randomization will reduce the peaks of undesirable ghost images.

Figure 18:
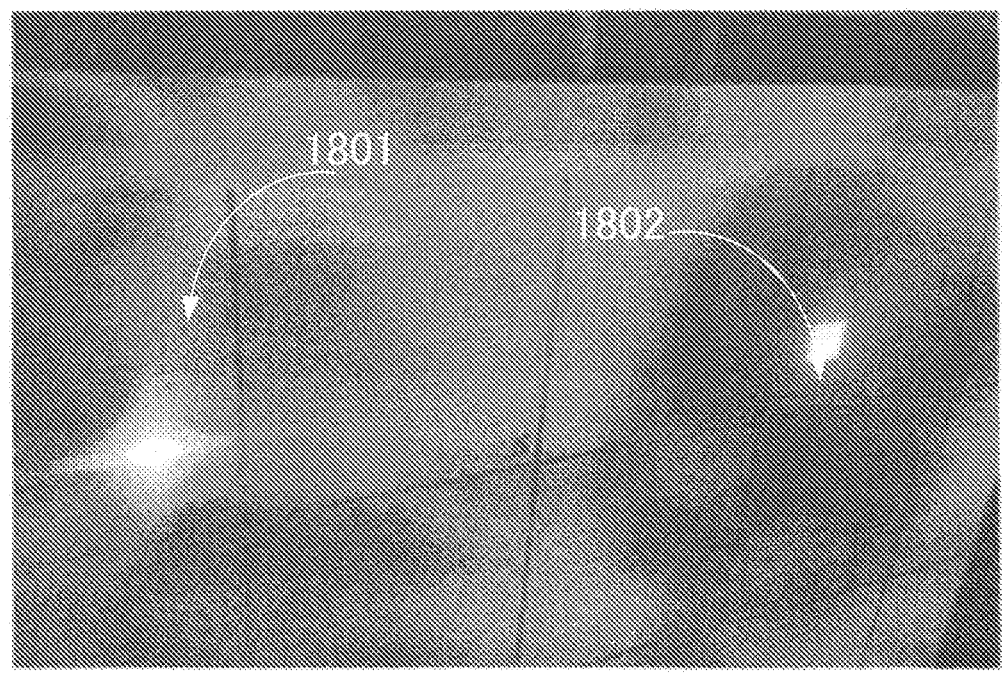
FIG. 18 shows another example of comparison between calculated spectrum (1803 and 1804) and actual light beam intensity (1801 and 1802).
Figure 18:
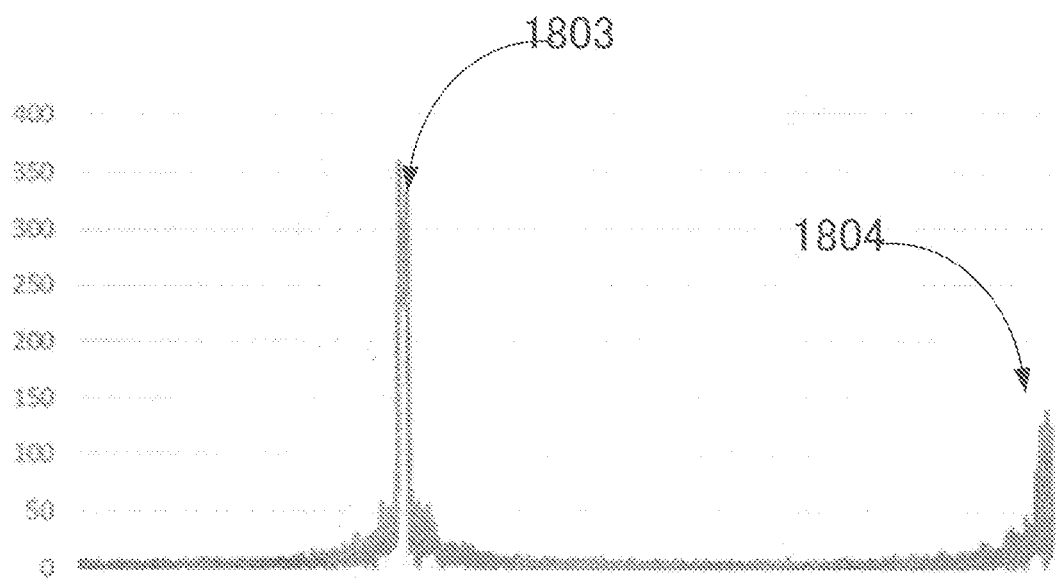
Figure 19:
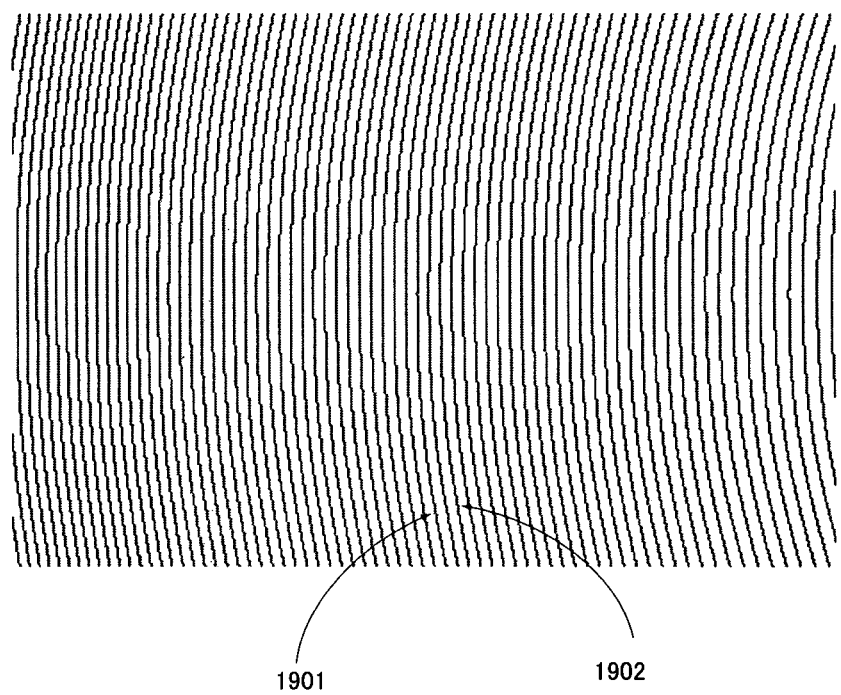
FIG. 19 shows the pattern of DOE's grooves (1901 and 1902).

Another example is embodiments is to modify the original optics design as shown in FIG. 18 (Fourier Transfer Distribution) and FIG. 19 (Phase shift function shown in equi-height lines), where the pitches of saw tooth varies for every line and Fourier Transform (FIG. 18) has very little undesirable peaks.

Though the invention has been described with respect to specific preferred and alternative embodiments, many additional variations and modifications will become apparent to those skilled in the art upon reading the present application. Thus it is the intention that the appended claims be interpreted as broadly as possible in view of the prior art to include all such variations and modifications.

We claim:

1. A see-through display system comprising:
an eyeglass lens and
a single see-through diffractive optical element (DOE) attached to the eyeglass lens wherein a spectrum of a Fourier transform of a surface shape of said single DOE is converted from a phase function to a sliced phase function therefore having a single peak within a viewing angle, and other peaks outside of the viewing angle of the eyeglass lens, for looking directly through the eyeglass lens attached with the single DOE on an image through a reflected light of an image light projected and guided by optical elements surrounding a human face to project to a tilted mirror for reflecting the reflected light of the image onto the DOE on the eyeglass lens wherein the reflected light projects the single peak from the single DOE for perceiving an image of the image light without ghost images.

2. The see-through display system of claim 1 wherein:
the surface shape of the single DOE is disposed on a semiconductor wafer comprises a plurality of saw tooth with a randomized pitch between adjacent saw tooth to reduce peaks of the spectrum of the Fourier transform of the surface shape of the single DOE other than the single peak of the spectrum of the Fourier transform within the viewing angle of the eyeglass lens.

3. The see-through display system of claim 1 wherein:
the surface shape of the single DOE is designed and formed to add a negative spectrum of the Fourier transform to reduce peaks of the spectrum of the Fourier transform other than the single peak of the spectrum of the Fourier transform within the viewing angle of the eyeglass lens.

4. The see-through display system of claim 1 wherein:
the surface shape of the single DOE is designed to have a phase shift function to reduce peaks of the spectrum of the Fourier transform other than the single peak of the spectrum of the Fourier transform within the viewing angle of the eyeglass lens.

5. A display system comprising:
a viewing lens having a viewing angle; and
a single DOE attached to the viewing lens to focus light beams, wherein a surface shape of said single DOE is converted from a phase function to a sliced phase function therefore a spectrum of a Fourier transform of the surface shape of said single DOE having a single peak within the viewing angle, and other peaks outside of the viewing angle of the viewing lens, for looking directly through the viewing lens attached with the single DOE on an image through a reflected light of an image light projected and guided by optical elements surrounding a human face to project to a tilted mirror for reflecting the reflected light of the image onto the DOE on the viewing lens wherein the reflected light projects the single peak from the single DOE for perceiving an image of the image light without ghost images.

6. The display system of claim 5 wherein:
the surface shape of the single DOE is disposed on a semiconductor wafer comprises a plurality of saw tooth with a randomized pitch between adjacent saw tooth to reduce peaks of the spectrum of the Fourier transform of the surface shape of single DOE other than the single peak of the spectrum of the Fourier transform.

7. The display system of claim 5 wherein:
the surface shape of the single DOE is designed and formed to add a negative spectrum of the Fourier transform to reduce peaks of the spectrum of the Fourier transform other than the single peak of the spectrum of the Fourier transform.

8. The display system of claim 5 wherein:
the surface shape of the single DOE is designed to have a phase shift function to reduce peaks of the spectrum of the Fourier transform other than the single peak of the spectrum of the Fourier transform for looking through the eyeglass lens on the image.

* * * * *